US012759095B2

(12) United States Patent
Lin et al.

(10) Patent No.: US 12,759,095 B2
(45) Date of Patent: Oct. 13, 2026

(54) LASER PROCESSING EQUIPMENT AND METHOD

(71) Applicant: National Central University, Tao-Yuan City (TW)

(72) Inventors: Chih-Kuang Lin, Tao-Yuan City (TW); Jeng-Rong Ho, Tao-Yuan City (TW); Pi-Cheng Tung, Tao-Yuan City (TW)

(73) Assignee: National Central University, Tao-Yuan City (TW)

( * ) Notice: Subject to any disclaimer, the term of this patent is extended or adjusted under 35 U.S.C. 154(b) by 1072 days.

(21) Appl. No.: 17/938,951

(22) Filed: Sep. 7, 2022

(65) Prior Publication Data

US 2023/0415280 A1 Dec. 28, 2023

(30) Foreign Application Priority Data

Jun. 28, 2022 (TW) ................................. 111124109

(51) Int. Cl.

| | |
|---|---|
| ***B23K 37/04*** | (2006.01) |
| ***B23K 26/0622*** | (2014.01) |
| ***B23K 26/08*** | (2014.01) |
| ***B23K 26/70*** | (2014.01) |

(52) U.S. Cl.

CPC ...... *B23K 37/0461* (2013.01); *B23K 26/0622* (2015.10); *B23K 26/083* (2013.01); *B23K 26/702* (2015.10)

(58) Field of Classification Search

CPC .... B23K 10/006; B23K 26/032; B23K 26/08; B23K 26/082; B23K 26/0853; B23K 26/0876; B23K 26/38; B23K 37/0211; B23K 37/0235; B23K 37/0408; B23K 26/044

See application file for complete search history.

(56) References Cited

U.S. PATENT DOCUMENTS

| | | | | |
|---|---|---|---|---|
| 10,379,517 | B2 * | 8/2019 | Shapiro | B23K 26/032 |
| 10,496,070 | B2 * | 12/2019 | Shapiro | B23K 26/032 |
| 10,520,915 | B2 * | 12/2019 | Shapiro | B23K 26/032 |

(Continued)

FOREIGN PATENT DOCUMENTS

| | | | |
|---|---|---|---|
| CN | 101446699 | A | 6/2009 |
| CN | 110102908 | A | 8/2019 |

(Continued)

*Primary Examiner* — Chris Q Liu

(57) ABSTRACT

Laser processing equipment includes a base, a platform, a first image capturing device, a main control device, a second image capturing device and a laser module. The platform, the first and second image capturing device and the laser module are arranged on the top surface of the base and are electrically connected with the main control device. The first image capturing device shoots a workpiece and generates a first image. The main control device searches a target area in the workpiece based on the first image, and the target area includes specific features. The second image capturing device shoots the target area and generates a second image. The main control device performs a feature identification step for specific features based on the first or second image and controls the laser module to process the workpiece based on the result of identification. The invention also provides a laser processing method.

5 Claims, 5 Drawing Sheets

(56) References Cited

U.S. PATENT DOCUMENTS

| | | | | |
|---|---|---|---|---|
| 2017/0235293 | A1* | 8/2017 | Shapiro | B23K 37/0408 700/166 |
| 2020/0089185 | A1 | 3/2020 | Shapiro et al. | |
| 2021/0304396 | A1* | 9/2021 | Addington | G01N 21/958 |

FOREIGN PATENT DOCUMENTS

| | | | |
|---|---|---|---|
| CN | 210387969 | U | 4/2020 |
| CN | 111098034 | A | 5/2020 |
| JP | H08297796 | A | 11/1996 |
| JP | 2017189809 | A | 10/2017 |

* cited by examiner

LASER PROCESSING EQUIPMENT AND METHOD

FIELD OF THE INVENTION

The invention relates to laser processing equipment and a laser processing method, and more particularly to laser processing equipment and a laser processing method in combination with image capturing devices.

BACKGROUND OF THE INVENTION

In the production process of printed circuit boards, photoresists are often used in the exposure or development process to perform transfer print on photomask patterns. Because the photoresists are mostly hydrocarbons, they can be dissolved by a specific chemical solvent after exposure. However, it is still unavoidable that there is certain residual photoresist on the surface of the printed circuit board, which will affect subsequent processes. At present, residues on the printed circuit board are mostly inspected and removed manually, which not only is time-consuming and laborious but also easily causes damage to other elements on the printed circuit board during removal.

SUMMARY OF THE INVENTION

The invention provides laser processing equipment and a laser processing method. Residues are inspected and removed at a time to save a lot of manpower and time and to avoid damage to other elements, so as to ensure the yield of the entire manufacture procedure.

In order to solve the above problems, an embodiment of the invention provides laser processing equipment for processing a workpiece, the laser processing equipment including a base, a platform, a first image capturing device, a main control device, a second image capturing device and laser module. The base has a top surface. The platform is arranged on the top surface and configured for bearing the workpiece. The first image capturing device is arranged on the top surface and suitable for shooting the workpiece and generating a first image. The main control device is electrically connected with the platform and the first image capturing device. The main control device receives the first image shot by the first image capturing device and searches a target area in the workpiece, where the target area includes specific features. The second image capturing device is arranged on the top surface and electrically connected with the main control device. The second image capturing device shots the target area and generates a second image. The main control device performs a feature identification step for the specific features in the target area based on the first image or the second image. The laser module is electrically connected with the main control device. The main control device controls the laser module to perform a laser process on the workpiece based on a result of the feature identification step. The main control device is capable of controlling relative displacement of the platform, the first image capturing device, the second image capturing device and the laser module. The field of view of the first image capturing device is wider than the field of the view of the second image capturing device. The resolution of the second image capturing device is higher than the resolution of the first image capturing device.

In an embodiment of the invention, the first image capturing device includes a plurality of image capturing elements arranged along a linear direction.

In an embodiment of the invention, the laser module includes a plurality of laser sources.

In an embodiment of the invention, the plurality of laser sources include a continuous wave laser or a pulsed laser.

In an embodiment of the invention, the plurality of laser sources include a $CO_2$ laser, a CO laser, a helium-cadmium laser, a semiconductor laser, an optical fiber laser, a helium-neon laser, an excimer laser or an yttrium-aluminum-garnet (YAG) laser.

In an embodiment of the invention, laser light of the laser sources includes deep ultraviolet light, ultraviolet light, green light, near-infrared light or mid-infrared light.

In an embodiment of the invention, the first image capturing device and the platform move relatively along a first direction, the second image capturing device and the laser module move along a second direction and a third direction, and the first direction, the second direction and the third direction are orthogonal to one another.

An embodiment of the invention provides a laser processing method, including the following steps: providing a workpiece, wherein the workpiece includes a target area, and the target area includes specific features; performing a positioning step, shooting, by a first image capturing device, the workpiece and generating a first image, transmitting, by the first image capturing device, the first image to a main control device, and searching, by the main control device, the target area on the workpiece through the first image; if the resolution of the first image is sufficient to perform a feature identification step, then: performing, by the main control device, the feature identification step based on the first image, performing a contour identification and/or a material identification on the specific features in the target area; and performing a laser processing step, controlling, by the main control device, a laser module to perform a laser process on the specific features based on a result of the feature identification step; if the resolution of the first image is insufficient to perform the feature identification step, then: performing a fine positioning step, controlling, by the main control device, a second image capturing device to shoot the target area and generate a second image, and receiving, by the main control device, the second image; performing, by the main control device, the feature identification step based on the second image, performing the contour identification and/or the material identification on the specific features in the target area; and performing the laser processing step.

In an embodiment of the invention, the laser processing step further includes the step of performing, by the main control device, computer-aided design (CAD)/computer-aided manufacturing (CAM) modeling based on a result of the contour identification, and performing processing path planning of the laser process based on a result of the CAD/CAM modeling.

In an embodiment of the invention, the laser processing step further includes the step of adjusting, by the main control device, parameters of a laser source of the laser module based on a result of the material identification.

In an embodiment of the invention, the laser module includes a plurality of laser sources. The laser processing step further includes the step of selecting, by the main control device, one or more of the plurality of laser sources based on the type of the workpiece or the result of the material identification to perform the laser processing step.

In an embodiment of the invention, before the positioning step, the main control device controls the laser module to perform a laser pre-process on the workpiece.

The two image capturing devices are used in the laser processing equipment and the laser processing method according to an embodiment of the invention to scan the workpiece in a wide range to search the target area and to perform the contour and material identification on the specific features in the target area in order to select the appropriate laser source and laser parameters for performing a laser process on the workpiece. Thus, residues can be detected and removed at a time without causing damage to other elements around.

DETAILED DESCRIPTION OF PREFERRED EMBODIMENTS

The invention will be described in more detail by examples with reference to the accompanying drawings.

Figure 1:
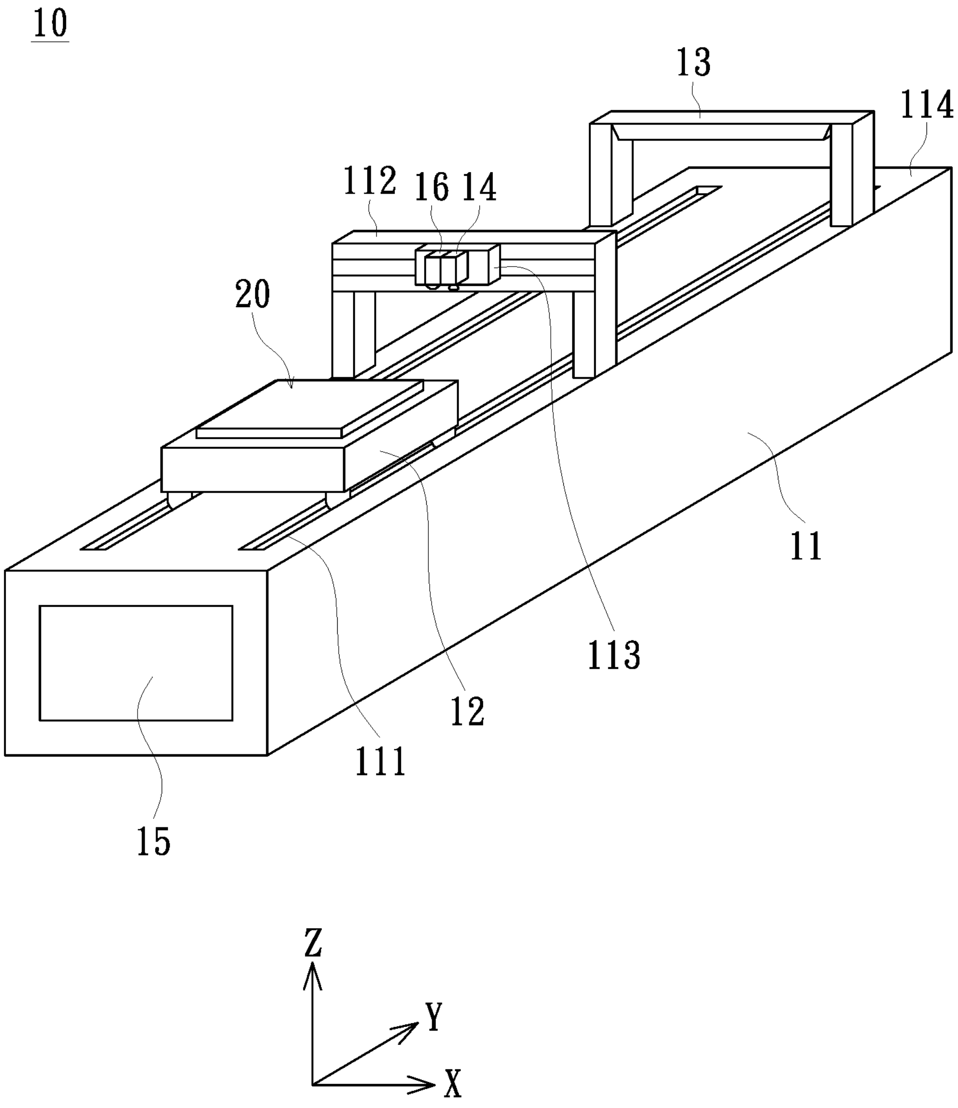
FIG. 1 is a three-dimensional schematic diagram of laser processing equipment according to an embodiment of the invention.
Figure 2:
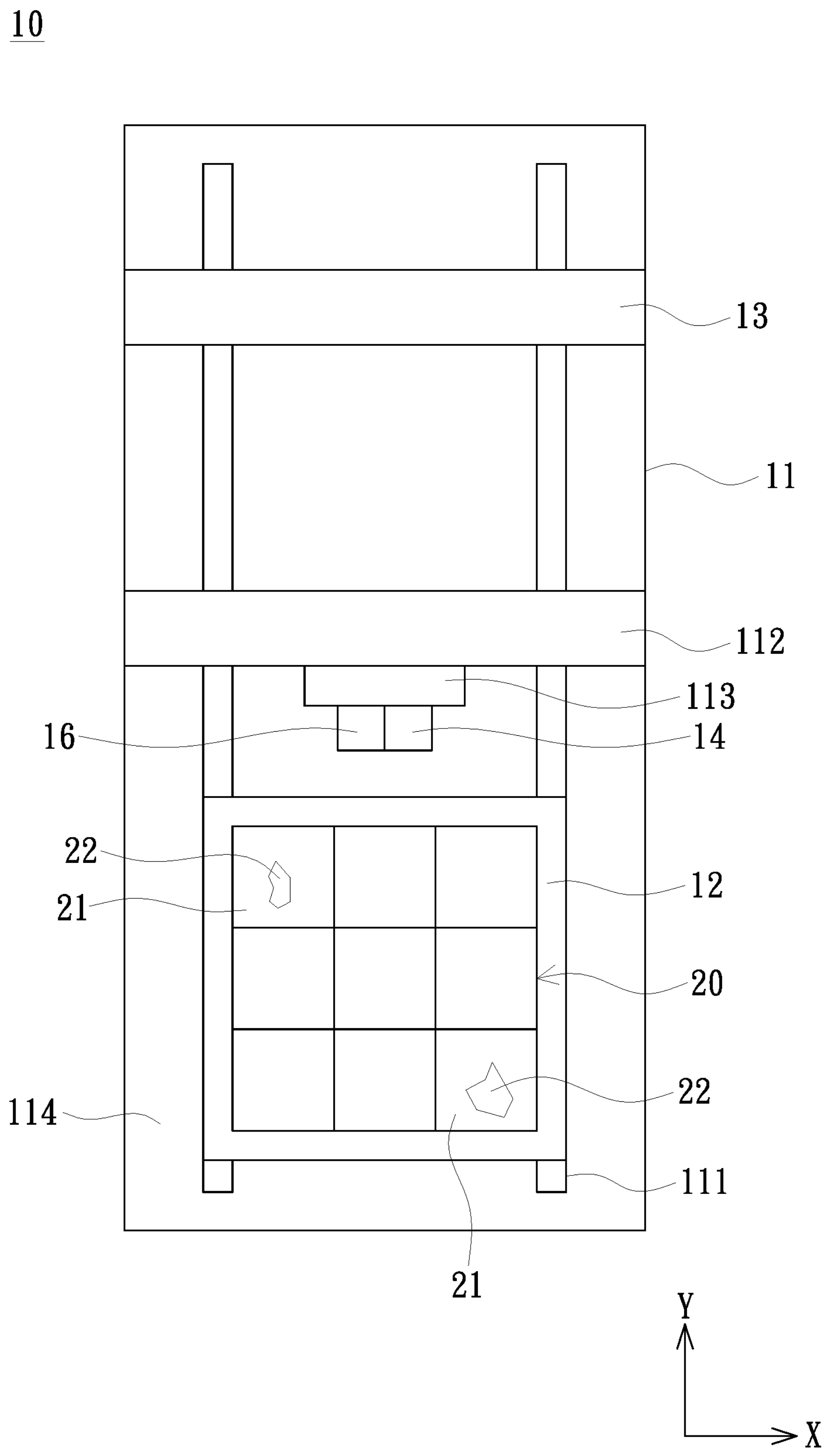
FIG. 2 is a schematic top view of the laser processing equipment according to an embodiment of the invention.
Figure 3:
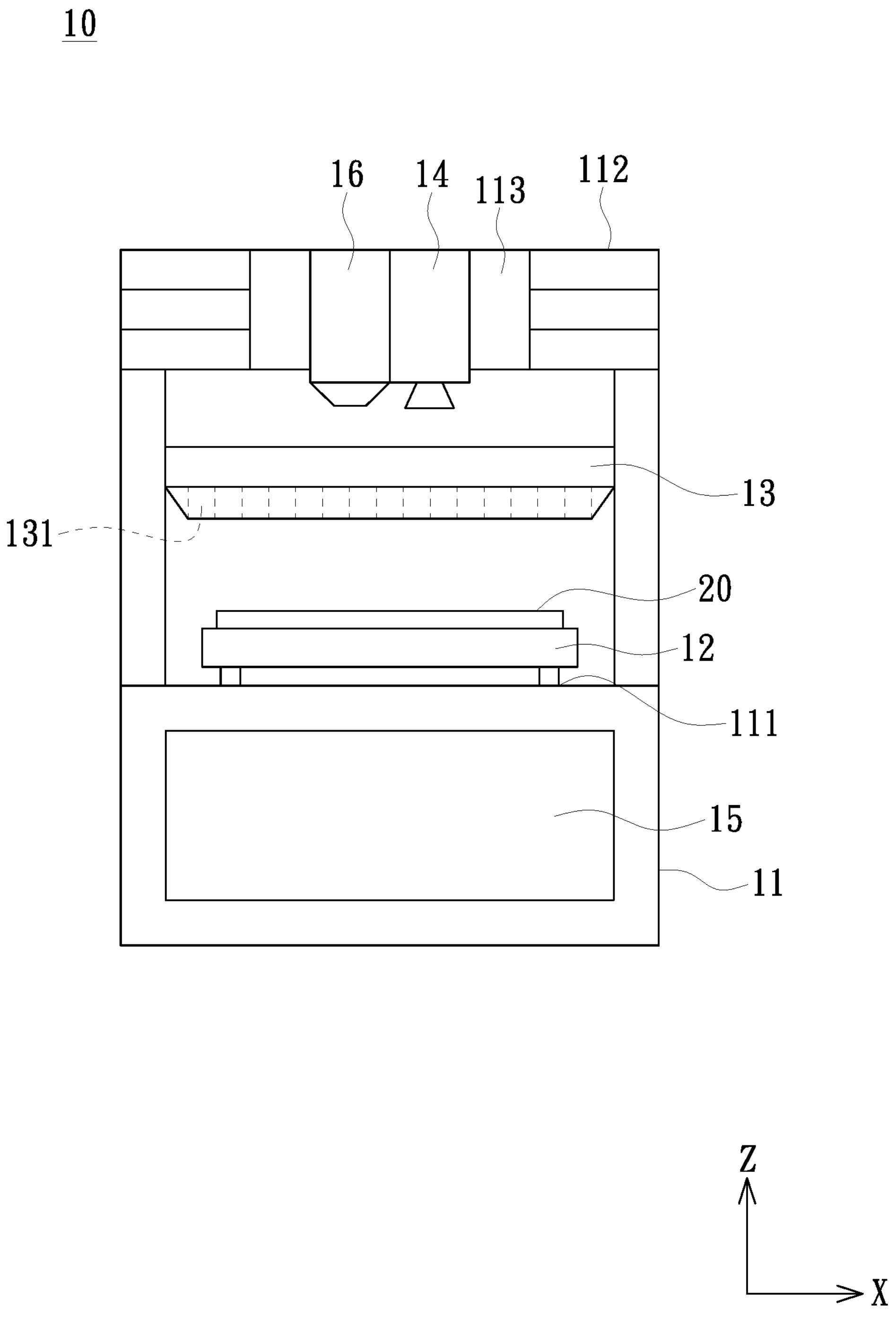
FIG. 3 is a schematic side view of the laser processing equipment according to an embodiment of the invention.
Figure 5:
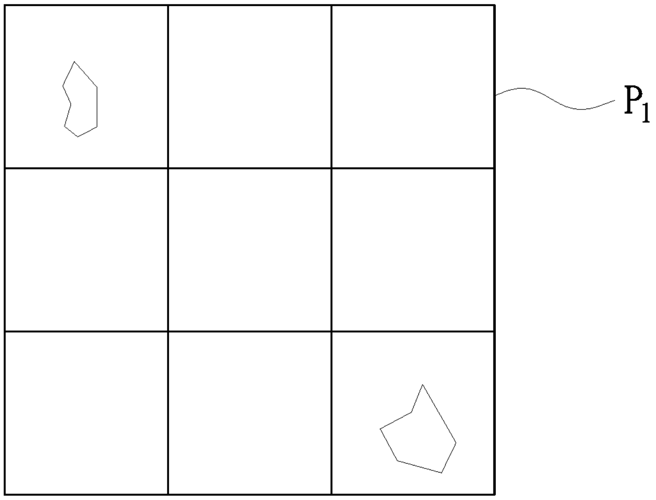
FIG. 5 is a schematic diagram of a first image in the laser processing method according to an embodiment of the invention.
Figure 6:
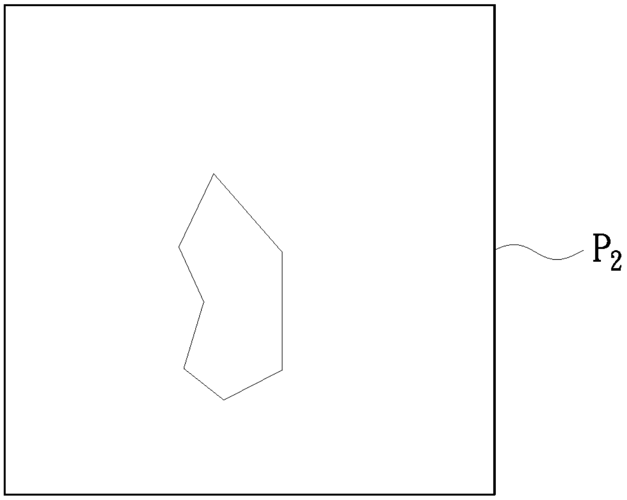
FIG. 6 is a schematic diagram of a second image in the laser processing method according to an embodiment of the invention.

Referring to FIG. 1 to FIG. 3. FIG. 1 is a three-dimensional schematic diagram of laser processing equipment according to an embodiment of the invention. FIG. 2 is a schematic top view of the laser processing equipment according to an embodiment of the invention. FIG. 3 is a schematic side view of the laser processing equipment according to an embodiment of the invention. FIG. 1 shows laser processing equipment 10 for processing a workpiece 20. The laser processing equipment 10 includes a base 11, a platform 12, a first image capturing device 13, a main control device 15, a second image capturing device 14 and a laser module 16. The base 11 has a top surface 114. The platform 12 is arranged on the top surface 114 of the base 11 and configured for bearing the workpiece 20. The first image capturing device 13 is arranged on the top surface 114 and suitable for shooting the workpiece 20 and generating a first image $P_1$ (as shown in FIG. 5). The main control device 15 is electrically connected with the platform 12 and the first image capturing device 13. The main control device 15 receives the first image $P_1$ shot by the first image capturing device 13 and searches one or more target areas 21 in the workpiece 20 based on the first image $P_1$. The target area includes one or more specific features 22. The second image capturing device 14 is arranged on the top surface 114 and electrically connected with the main control device 15. The second image capturing device 14 shots the target area 21 and generates a second image $P_2$ (as shown in FIG. 6). The main control device 15 performs a feature identification step for the specific features 22 in the target area 21 based on the first image $P_1$ or the second image $P_2$. The laser module 16 is electrically connected with the main control device 15. The main control device 15 controls the laser module 16 to perform a laser process on the workpiece 20 based on a result of the feature identification step. The main control device 15 is capable of controlling relative displacement of the platform 12, the first image capturing device 13, the second image capturing device 14 and the laser module 16.

Continuing with the above description, the first image capturing device 13 is, for example, a linear scanner. For example, the first image capturing device 13 includes a plurality of image capturing elements 131 (shown in FIG. 3) arranged along a linear direction, which is a first direction corresponding to one side of the workpiece 20, such as an X direction as shown in FIG. 1. In addition, the first image capturing device 13 having the appropriate width can be selected according to the side length of the workpiece 20 in the first direction. When the workpiece 20 moves relative to the first image capturing device 13 along a second direction, the plurality of image capturing elements 131 arranged along the first direction cause the first image capturing device 13 to comprehensively scan the workpiece 20 in a long-strip range. The second direction may be a Y direction as shown in FIG. 1. The first image capturing device 13 is arranged on the top surface 114 of the base 11. In this embodiment, the first image capturing device 13 is directly arranged on the top surface 114. However, the invention is not limited to this. The first image capturing device 13 can also be arranged on the top surface 114 by a linear slide rail, and is suitable to move on the linear slide rail along the second direction to perform comprehensive image capturing on the workpiece 20.

Continuing with the above description, the top surface 114 of the base 11 is provided with, for example, a first linear slide rail 111 and a second linear slide rail 112. The platform 12 is arranged on the first linear slide rail 111, and is arranged on the top surface 114 of the base 11 by the first linear slide rail 111. The platform 12 is suitable to move on the first linear slide rail 111 along the second direction. In an embodiment, the second direction may be the Y direction as shown in FIG. 1. When the first image capturing device 13 shoots the workpiece 20 on the platform 12 to generate the first image $P_1$, the platform 12 moves along the second direction, such that the first image capturing device 13 scans the workpiece 20 comprehensively. In this embodiment, during the shooting of the first image $P_1$, the first image capturing device 13 is fixedly arranged on the top surface 114, and the platform 12 moves relatively to the first image capturing device 13, but the invention is not limited thereto. In another embodiment which is not shown, the platform 12 can be fixed, and the first image capturing device 13 moves along the second direction.

Continuing with the above description, the second linear slide rail 112 is fixedly arranged on the top surface 114 of the base 11, and the second image capturing device 14 and the laser module 16 are jointly arranged on the second linear slide rail 112 by a third linear slide rail 113. The second image capturing device 14 and the laser module 16 can be arranged coaxially, that is to say, the second image capturing device 14 and the laser module 16 are both designed to have a common optical axis. In an embodiment, the third linear slide rail 113 is a slide rail arranged on the second linear slide rail 112 and suitable to move along the first direction which may be the X direction. Thus, the second image capturing device 14 and the laser module 16 arranged on the third linear slide rail 113 are movable along the first direction. In this embodiment, the platform 12 moves along the second direction, and the second image capturing device 14 and the laser module 16 move along the first direction, such that when the second image capturing device 14 shoots the workpiece 20 on the platform 12 or the laser module 16 performs a laser process on the workpiece 20, shooting or the laser process can be performed on any position on the workpiece 20, but the invention is not limited thereto. The platform 12, the second image capturing device 14 and the laser module 16 are also movable in both the first direction and the second direction. In an embodiment, the second image capturing device 14 and the laser module 16 are movable on the third linear slide rail 113 along a third direction which may be a Z direction as shown in FIG. 1. Thus, the second image capturing device 14 and the laser module 16 can perform focusing of a lens during shooting or focusing of a laser beam during a laser process by the third linear slide rail 113.

Continuing to refer to FIG. 1 to FIG. 3, the main control device 15 is arranged in the base 11 and is electrically connected with the first image capturing device 13, the second image capturing device 14, the laser module 16, the platform 12 and the third linear slide rail 113. In this embodiment, the main control device 15 controls the platform 12 to move along the second direction, such that the first image capturing device 13 shoots the workpiece 20 on the platform 12 and generates the first image $P_1$. The main control device 15 receives the first image $P_1$ and then searches the target area 21 having the specific features 22 in the workpiece 20 based on the first image $P_1$. There may be one or more target areas 21 and one or more specific features 22 in the target area 21. The main control device 15 controls the platform 12 and the third linear slide rail 113 to move the target area 21 to the position under the second image capturing device 14 so as to perform shooting and generate the second image $P_2$ (as shown in FIG. 6). The main control device 15 performs the feature identification step for the specific features 22 in the target area 21 based on the first image $P_1$ or the second image $P_2$. Next, the main control device 15 controls the platform 12 and the third linear slide rail 113 to move the specific features 22 in the target area 21 to the position under the laser module 16 so as to perform a laser process on the workpiece 20. In an embodiment, the main control device 15 may include a plurality of controllers (not shown in figure) for controlling the platform 12, the first image capturing device 13, the second image capturing device 14 and the laser module 16 respectively. In another embodiment, the main control device 15 may be electrically connected to a plurality of controllers for controlling the platform 12, the first image capturing device 13, the second image capturing device 14 and the laser module 16 respectively.

Continuing with the above description, the laser module 16 may include a plurality of laser sources. The plurality of laser sources are different laser sources, including a continuous wave or pulsed laser source. The continuous wave laser source may be a $CO_2$ laser, a CO laser, a helium-cadmium laser, a semiconductor laser, an optical fiber laser or a helium-neon laser. The pulsed laser source may be an excimer laser, an optical fiber laser or an yttrium-aluminum-garnet (YAG) laser. Laser light of the laser sources includes deep ultraviolet light, ultraviolet light, green light, near-infrared light or mid-infrared light. The main control device 15 selects a suitable laser source in the plurality of laser sources based on the result of the feature identification step or a material of the workpiece 20 to perform a laser process on the specific features 22 on the workpiece 20. In an embodiment, when the workpiece 20 includes a plurality of specific features 22, the main control device 15 can select a plurality of laser sources to process different specific features 22 with different laser sources respectively. In addition, the main control device 15 can also adjust parameters of the selected laser source based on the result of the feature identification step to perform a laser process on the specific features 22 in the target area 21.

Figure 4:
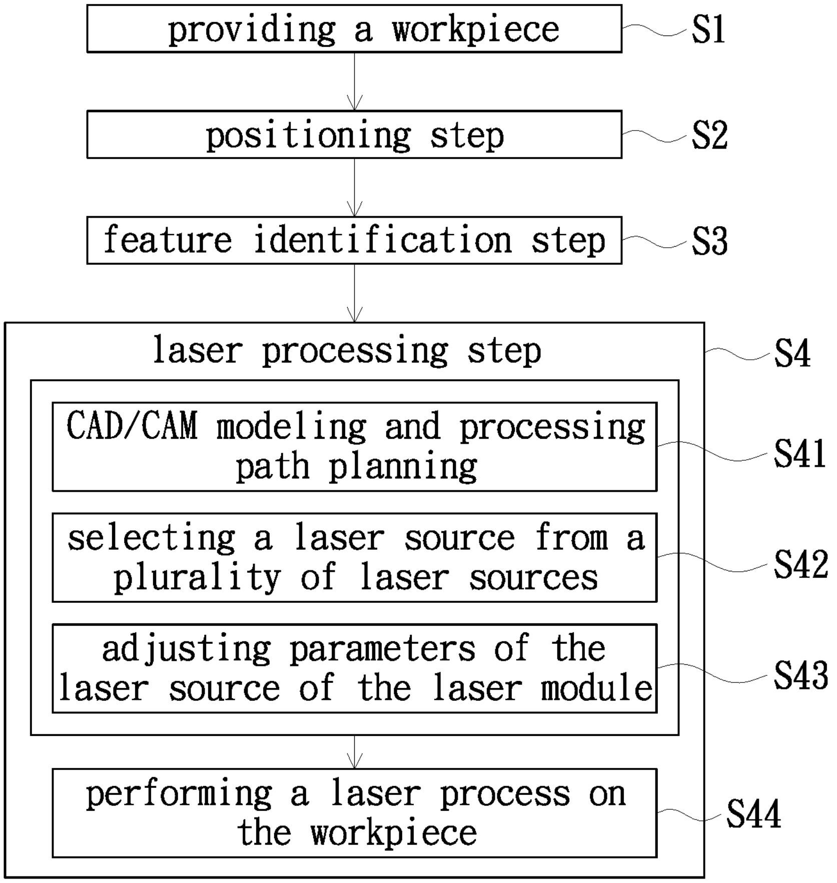
FIG. 4 is a schematic flowchart of a laser processing method according to an embodiment of the invention.

Referring to FIG. 4 to FIG. 6. FIG. 4 is a schematic flowchart of a laser processing method according to an embodiment of the invention. FIG. 5 is a schematic diagram of a first image in the laser processing method according to an embodiment of the invention. FIG. 6 is a schematic diagram of a second image in the laser processing method according to an embodiment of the invention. A laser processing method according to an embodiment of the invention includes the following steps. Step S1: providing a workpiece 20. The workpiece 20 includes a target area 21, and the target area 21 includes specific features 22. Next, perform step S2: a positioning step. A first image capturing device 13 shoots the workpiece 20 and generates a first image $P_1$. The first image capturing device 13 transmits the first image $P_1$ to a main control device 15. The main control device 15 searches the target area 21 on the workpiece 20 by the first image $P_1$. The target area 21 may include one or more specific features 22. In an embodiment, the first image $P_1$ is an image including the entire workpiece 20, and the workpiece 20 may include one or more target areas 21.

Continuing to refer to FIG. 4. Perform step S3: a feature identification step. The main control device 15 performs a contour identification and/or a material identification on the specific features 22 in the target area 21. There is no specific performing sequence for the contour identification and the material identification in the above feature identification step. In another embodiment, before the step S3 is performed, whether a fine positioning step needs to be performed first may be determined according to whether the resolution of the first image $P_1$ is sufficient to perform the feature identification step. If the resolution of the first image $P_1$ is sufficient to perform the feature identification step, then the main control device 15 performs the feature identification step based on the first image $P_1$ to perform the contour identification and/or material identification on the specific features 22 in the target area 21. If the resolution of the first image $P_1$ is insufficient to perform the feature identification step, then the fine positioning step is performed first. The main control device 15 controls a second image capturing device 14 to shoot the target area 21 and generate a second image $P_2$. The main control device 15 receives the second image $P_2$. Next, the main control device 15 performs the feature identification step based on the second image $P_2$ to perform the contour identification and/or material identification on the specific features 22 in the target area 21. In this embodiment, the laser processing method involves evaluating the resolution of the first image $P_1$ before the feature identification step to determine whether the fine positioning step should be performed, but the invention is not limited thereto. In another embodiment, a user can set the main control device 15 to preset the main control device 15 performing the feature identification step based on the first image $P_1$, or preset the main control device 15 performing the fine positioning step and performing the feature identification step based on the second image $P_2$ when the laser processing method is performed.

Continuing with the above description. After performing step S3, the feature identification step, the main control device 15 performs step S4, a laser processing step. The main control device 15 controls a laser module 16 to perform a laser process on the workpiece 20 based on a result of the feature identification step.

In step S1, the workpiece 20 can be provided to a platform 12, and the platform 12 can fix the workpiece 20 to the platform 12 by means of adsorption, limiting elements, etc.

The workpiece 20 may be a flat type workpiece such as a printed circuit board, a substrate, glass or a cell phone cover. The specific features 22 may be glue residues, scratches, electronic wiring defects, etc.

In step S2, the main control device 15 first controls the platform 12 to move the workpiece 20 to the first image capturing device 13 and move the workpiece 20 along a second direction during shooting, such that the first image capturing device 13 scans the entire workpiece 20 and then generates the first image $P_1$. The main control device 15 determines where there are the specific features 22 on the workpiece 20 by an image processing technology based on the first image $P_1$ for designation, and defines a block with the specific features 22 as the target area 21. The image processing technology may include hue, saturation and value (HSV) color filtering, gray-level transformation, median filtering, binarization, Canny edge detection, etc. At this stage, the main control device 15 can also calculate the area and perimeter of the specific features 22.

In the fine positioning step, the main control device 15 controls the platform 12 to move along the second direction and controls a third linear slide rail 113 to move along the first direction, such that the target area 21 is moved to the position under the second image capturing device 14 to perform shooting and generate the second image $P_2$ (as shown in FIG. 6).

In step S3, the main control device 15 receives the first image $P_1$ or the second image $P_2$, and performs a contour identification and/or a material identification on the specific features 22 in the target area 21 by the image processing technology based on the first image $P_1$ or the second image $P_2$. There is no specific performing sequence for the contour identification and the material identification which may also be performed simultaneously. The image processing technology may include hue, saturation and value (HSV) color filtering, gray-level transformation, median filtering, binarization, Canny edge detection, etc. The contour identification is to identify the shape of the specific features 22, such as area, perimeter or position. The material identification is to determine whether the specific features 22 are glue residues, scratches or electronic wiring defects based on image information such as grayscale values related to the specific features 22 in the first image $P_1$ or the second image $P_2$. In an embodiment, the first image capturing device 13 and the second image capturing device 14 have different specifications. The first image capturing device 13 may be a linear scanner with a plurality of image capturing elements arranged along a linear direction, and the scanning width thereof corresponds to the side length of the workpiece 20 in the first direction, such as 9 cm, 10 cm, 15 cm, 20 cm or 30 cm. The second image capturing device 14 may be a microscope, and a field of view (FOV) thereof may be 6 mm*5 mm or smaller. Thus, the field of view of the first image capturing device 13 is wider than the field of view of the second image capturing device 14. In addition, the resolution of the first image capturing device 13 may be about 6 μm, while the resolution of the second image capturing device 14 may be 1 μm, such that the resolution of the second image capturing device 14 is higher than the resolution of the first image capturing device 13.

In step S4, the main control device 15 controls the platform 12 and the third linear slide rail 113 to move the specific features 22 in the target area 21 to the position under the laser module 16, so as to perform a laser process on the specific features 22 on the workpiece 20. The step S4 includes, for example, performing step S41: computer-aided design (CAD)/computer-aided manufacturing (CAM) modeling and processing path planning; step S42: selecting a laser source from a plurality of laser sources; step S43: adjusting parameters of the laser source of the laser module 16; and step S44: performing a laser process on the workpiece.

Continuing with the above description, in step S41, the CAD/CAM modeling and processing path planning refer to that the main control device 15 performs CAD/CAM modeling based on a result of the contour identification, and performs path planning of the laser process on the workpiece 20 in step S44 based on a result of the CAD/CAM modeling. In step S42, selecting a laser source from a plurality of laser sources refers to that the laser module 16 includes a plurality of laser sources which may be a $CO_2$ laser, a CO laser, a helium-cadmium laser, a semiconductor laser, an optical fiber laser, a helium-neon laser, an excimer laser or an yttrium-aluminum-garnet (YAG) laser. The main control device 15 selects one of the laser sources based on the type of the workpiece 20 or the result of the material identification to perform the step S44. For example, if the workpiece 20 is a metal with high reflectivity, a laser source with a green laser is selected for processing. In this embodiment, the main control device 15 selects a laser source from a plurality of laser sources to perform a laser process on the workpiece 20, but the invention is not limited thereto. The main control device 15 can also select multiple laser sources from a plurality of laser sources to process the workpiece 20. In the step S43, adjusting the parameters of the laser source of the laser module 16 refers to that the main control device 15 adjusts the parameters of the laser source of the laser module 16 based on the result of the material identification. The parameters of the laser source may be, for example, power, pulse frequency, focal length, focal plane, etc. Processing the workpiece 20 in step S44 refers to performing a laser process on the workpiece 20 based on the results/result of the contour identification and/or material identification or according to the setting of the step S41, the step S42 or the step S43.

In an embodiment, before the above positioning step S2, the main control device 15 controls the laser module 16 to perform a laser pre-process on the workpiece 20. The entire workpiece 20 or a specific area on the workpiece 20 is firstly subjected to a laser pre-process by the laser module 16, for example, performing the laser pre-process on the unidentifiable specific features 22. The laser pre-process may be, for example, laser cleaning, and laser source parameters of the laser pre-process may be different from laser source parameters in the subsequent laser processing step.

The laser processing equipment and the laser processing method according to the invention may be used to remove glue residues such as photoresists on printed circuit boards, defects on glass, glue residues on cell phone covers, etc., and may also be used to perform laser repair of substrates, such as repair of electronic wiring defects, etc. The user performs identification by the image processing technology and then can select the appropriate laser source according to the type of the workpiece or an object to be removed or repaired for one-time processing, thereby saving a lot of manpower and time.

The two image capturing devices can be used in the invention. First, the first image capturing device with the wider field of view, such as the linear scanner, scans the workpiece in a wide range to search the target area, then the second image capturing device with the higher resolution, such as the microscope lens, performs the contour and material identification on the specific features in the target area, and the appropriate laser source is selected based on the results of the identifications and is adjusted in parameters, so as to perform a laser process on the workpiece at a time. Meanwhile, the damage to other elements around is avoided, thereby improving the yield of the entire manufacture procedure.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A laser processing method, comprising:

providing a workpiece, wherein the workpiece comprises at least one target area, and the at least one target area comprises at least one specific feature, wherein the at least one specific feature comprises a glue residue, a scratch, or an electronic wiring defect;

performing a positioning step comprising:

controlling, by a main control device, a relative movement between the workpiece and a first image capturing device;

capturing, by the first image capturing device, an image of the workpiece and generating a first image having a first resolution;

transmitting, by the first image capturing device, the first image to the main control device; and searching, by the main control device, for the at least one target area on the workpiece through the first image; and in response to determining that the first resolution of the first image is sufficient to perform a feature identification step:

performing, by the main control device, the feature identification step based on the first image, wherein the feature identification step comprises performing a contour identification or a material identification on the at least one specific feature in the at least one target area; and performing a laser processing step comprising controlling, by the main control device, a laser module to perform a laser process on the at least one specific feature based on a result of the feature identification step; and in response to determining that the first resolution of the first image is insufficient to perform the feature identification step:

performing a fine positioning step comprising:

controlling, by the main control device, a relative movement between the at least one target area and a second image capturing device to position the at least one target area within a field of view of the second image capturing device; and controlling, by the main control device, the second image capturing device to shoot the at least one target area and generate a second image, and receiving, by the main control device, the second image;

performing, by the main control device, the feature identification step based on the second image, performing the contour identification or the material identification on the at least one specific feature in the at least one target area; and performing the laser processing step;

wherein the first image capturing device and a platform are suitable to move relatively along a second direction, the second image capturing device and the laser module are suitable to move along a first direction and a third direction, and the first direction, the second direction and the third direction are orthogonal to one another.

2. The laser processing method according to claim 1, wherein the laser processing step further comprises performing, by the main control device, computer-aided design (CAD)/computer-aided manufacturing (CAM) modeling based on a result of the contour identification, and performing processing path planning of the laser process based on a result of the CAD/CAM modeling.

3. The laser processing method according to claim 1, wherein the laser processing step further comprises adjusting, by the main control device, parameters of a laser source of the laser module based on a result of the material identification.

4. The laser processing method according to claim 1, wherein the laser module comprises a plurality of laser sources, and the laser processing step further comprises selecting, by the main control device, one or more of the plurality of laser sources to perform the laser processing step based on a type of the workpiece or a result of the material identification.

5. The laser processing method according to claim 1, further comprising: prior to the positioning step, controlling, by the main control device, the laser module to perform a laser pre-process on the workpiece.

* * * * *